United States Patent [19]

Kondo et al.

[11] Patent Number: 5,110,871
[45] Date of Patent: May 5, 1992

[54] RUBBER COMPOSITIONS

[75] Inventors: Hitoshi Kondo, Tokyo; Makoto Sasaki, Yokohama; Yukio Kobayashi, Tokyo, all of Japan

[73] Assignees: Bridgestone Corporation; Nippon Oil Co., Ltd., both of Tokyo, Japan

[21] Appl. No.: 561,763

[22] Filed: Aug. 2, 1990

Related U.S. Application Data

[62] Division of Ser. No. 223,045, Jul. 22, 1988, Pat. No. 4,972,022.

[30] Foreign Application Priority Data

Aug. 6, 1987 [JP] Japan .................................. 62-195159
Aug. 6, 1987 [JP] Japan .................................. 62-195160

[51] Int. Cl.$^5$ .......................... C08L 33/06; C08L 35/02
[52] U.S. Cl. ..................................... 525/207; 525/221; 525/222
[58] Field of Search ........................ 525/207, 221, 222

[56] References Cited

U.S. PATENT DOCUMENTS 4,400,486   8/1983   Iwata et al. .......................... 525/207

Primary Examiner—Jacob Ziegler
Attorney, Agent, or Firm—Sughrue, Mion, Zinn, Macpeak & Seas

[57] ABSTRACT

A rubber composition having excellent cut resistance and chipping resistance comprises 1–30 parts by weight of a particular resin obtained by reacting a particular hydroxyl group-containing cyclopentadiene resin with a compound selected from polyisocyanate and/or polybasic acid or its anhydride or ester at a particular equivalent ratio, based on 100 parts by weight of rubber.

4 Claims, No Drawings

RUBBER COMPOSITIONS

This is a divisional of application Ser. No. 07/223,045, filed Jul. 22, 1988, now U.S. Pat. No. 4,972,022.

BACKGROUND OF THE INVENTION

1. Field of the Invention

This invention relates to rubber compositions, and more particularly to a rubber composition having improved cut resistance and chipping resistance by compounding a particular hydroxyl group containing cyclopentadiene resin modified with at least one compound selected from the group consisting of polyisocyanate, polybasic acid, and its anhydride and ester.

2. Related Art Statement

Heavy duty large size tires for truck and bus frequently running on non-paved road, particularly rock-exposed rough road, or off-the-road tires used in stone pites have a frequent chance of subjecting their tread and sidewall portions to cut failure. As a result, it is apt to cause tire burst due to the growth of the cut or due to the corrosion of steel cord reinforcement with rain water penetrated from the cut portion. Therefore, it is required to use a rubber composition having excellent cut resistance and chipping resistance in this type of the tire, particularly its tread portion.

In general, a method of highly filling carbon black is used as a means for improving the cut resistance of the rubber composition. In this case, however, the chipping resistance and heat build-up required in the running on bad road are considerably poor, and also the mixing and extrusion operations are remarkably poor.

On the other hand, Japanese Patent Application Publication No. 48-38,615 discloses that the cut resistance of the rubber composition can be improved by compounding styrene-butadiene copolymer with a cyclopentadiene series resin having a softening point of 50°–200° C. and a bromine number of 40–150. In this case, however, the chipping resistance is still poor though the cut resistance is largely improved.

In order to solve the aforementioned problems, the inventors have proposed in U.S. patent application Ser. No. 12,468 that cyclopentadiene resin modified with 5-alkylidene norbornene-2 or its derivative or cyclopentadiene resin modified with polyisocyanate compound is compounded into a rubber composition. However, the improvement of the cut resistance and chipping resistance is still insufficient in this rubber composition. Therefore, it is very important to further improve the cut resistance and chipping resistance.

SUMMARY OF THE INVENTION

It is an object of the invention to provide a rubber composition useful in the tread of the large size tire or off-the-road tire running on bad road as mentioned above and having more improved cut resistance and chipping resistance.

The inventors have made various studies in order to solve the aforementioned problems and found that these problems can be solved by compounding rubber with a resin obtained by reacting a hydroxyl group-containing cyclopentadiene resin copolymerized between cyclopentadiene ring containing compound or its Diels-Alder reaction adduct and compound having polymerizable double bond and hydroxyl group in its molecule with at least one compound selected from the group consisting of polybasic acids, their anhydrides and esters, or by compounding rubber with a resin obtained by reacting a hydroxyl group-containing compound copolymerized among cyclopentadiene ring containing compound or its Diels-Alder reaction adduct, 5-alkylidene norbornene-2 and compound having polymerizable double bond and hydroxyl group in its molecule with at least one compound selected from the group consisting of polyisocyanate, polybasic acids and their anhydrides and esters, and as a result the invention has been accomplished.

According to a first aspect of the invention, there is the provision of a rubber composition comprising 1 to 30 parts by weight of a resin (R2) obtained by reacting a hydroxyl group-containing cyclopentadiene resin (R1), which is obtained by heat copolymerizing 100 parts by weight of a component A being at least one compound selected from cyclopentadiene ring containing compound represented by the following general formula:

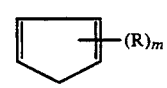
(I)

, wherein R is an alkyl group having a carbon number of 1–3 and m is an integer of 0–6, and its Diels-Alder reaction adduct with 2 to 120 parts by weight of a component B being a compound having polymerizable double bond and hydroxyl group in its molecule, with a component C being at least one compound selected from polybasic acids and their anhydrides and esters in such a manner that an equivalent ratio of carboxyl group and/or acid anhydride group (one acid anhydride group is bivalent) and/or ester group in said component C to hydroxyl group in said resin (R1) is within a range of 0.05–1.5, based on 100 parts by weight of at least one rubber selected from natural and synthetic rubbers.

According to a second aspect of the invention, there is the provision of a rubber composition comprising 1 to 30 parts by weight of a resin (R4) obtained by reacting a hydroxyl group-containing cyclopentadiene resin (R3), which is obtained by heat copolymerizing 100 parts by weight of a component A being at least one compound selected from cyclopentadiene ring containing compound represented by the following general formula:

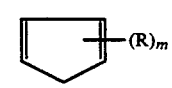
(I)

, wherein R is an alkyl group having a carbon number of 1–3 and m is an integer of 0–6, and its Diels-Alder reaction adduct with 1 to 120 parts by weight of a component B being a compound having polymerizable double bond and hydroxyl group in its molecule and 2 to 150 parts of a component D being 5-alkylidene norbornene-2 or its derivative represented by the following general formula:

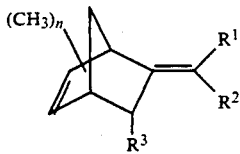

(II)

, wherein $R^1$, $R^2$ and $R^3$ are a hydrogen atom or an alkyl group having a carbon number of 1–3, respectively and n is 0 or 1, with a component E being at least one compound selected from polyisocyanates, polybasic acids and their anhydrides and esters in such a manner that an equivalent ratio of isocyanate group and/or carboxyl group and/or acid anhydride group (one acid anhydride group is bivalent) and/or ester group in said component E to hydroxyl group in said resin (R3) is within a range of 0.05–1.5, based on 100 parts by weight of at least one rubber selected from natural and synthetic rubbers.

DESCRIPTION OF THE PREFERRED EMBODIMENTS

As the synthetic rubber used in the invention, mention may be made of synthetic polyisoprene rubber, polybutadiene rubber, styrene-butadiene copolymer rubber, butyl rubber, halogenated butyl rubber, ethylene-propylene-diene terpolymer rubber, acrylonitrile-butadiene copolymer rubber and the like or a blend thereof. In the invention, natural rubber and synthetic rubber may be used alone or in admixture.

As the component A used in the invention, mention may be made of compounds represented by the general formula (I), such as dicyclopentadiene, cyclopentadiene methyl cyclopentadiene codimer, tricyclopentadiene and so on. These compounds or a mixture thereof are utilized industrially. Among them, cyclopentadiene, dicyclopentadiene and a mixture thereof are preferable.

Although cyclopentadiene, dicyclopentadiene or its alkyl substituted derivative is not always required to have a high purity, it is favorable that cyclopentadiene, dicyclopentadiene or its alkyl substituted derivative is existent in an amount of not less than 80% by weight. Moreover, a condensed fraction obtained by heat dimerizing cyclopentadiene and methyl cyclopentadiene contained in $C_5$ fraction of high-temperature pyrogenous by-produced oil such as naphtha or the like to obtain a mixture of dicyclopentadiene, dimethyl cyclopentadiene, cyclopentadiene-methyl cyclopentadiene codimer, cyclopentadiene-isoprene codimer, cyclopentadiene-piperilene codimer and so on, and then removing a greater part of $C_5$ components such as $C_5$ olefin, $C_5$ paraffin and so on through distillation may be used as the component A.

The component B or compound having polymerizable double bond and hydroxyl group in its molecule is hydroxyl group-containing unsaturated compounds having a carbon number of 3–22 and copolymerizable with the component A or a mixture thereof, which include unsaturated alcohols having a single alcoholic group such as allyl alcohol, methallyl alcohol, crotyl alcohol, cinnamyl alcohol, methyl-vinyl alcohol, allylcabinol, methylpropenylcarbinol and so on; unsaturated divalent alcohols having two alcoholic groups such as 2-butene-1,4-diol, 3-hexene-2,5-diol and so on; hydroxyalkyl acrylates such as 2-hydroxyethyl acrylate, 2-hydroxypropyl acrylate and so on; hydroxyalkyl methacrylates such as 2-hydroxyethyl methacrylate, 2-hydroxypropyl methacrylate and so on.

A the polybasic acid and its anhydride and ester of the component C, there are aliphatic polybasic acids and their anhydrides and esters, alicyclic polybasic acids and their anhydrides and esters, and aromatic polybasic acids and their anhydrides and esters, which include, for example, adipic acid, sebacic acid, maleic acid, fumaric acid, itaconic acid, maleic anhydride, dimethyl maleate, tetrahydrophthalic acid, 3,6-endomethylenetetrahydrophthalic anhydride, dimethyl tetrahydrophthalate, phthalic acid, isophthalic acid, phthalic anhydride, tetrachloropthalic anhydride, trimellitic anhydride, dimethyl terephthalate and a mixture thereof. These compounds may be used in admixture thereof.

As the component D, mention may be made of 5-ethylidene norbornene-2, 5-ethylidenemethyl norbornene-2, 5-ethylidenedimethyl norbornene-2, 5-propylidene norbornene-2, 5-isopropylidene norbornene-2 and a mixture thereof. Among them, 5-ethylidene norbornene-2 is preferable because it is easily available in industry.

The component E includes a polyisocyanate compound in addition to the above component C. As the polyisocyanate compound, mention may be made of aliphatic polyisocyanates, alicyclic polyisocyanates, heterocyclic polyisocyanates and aromatic polyisocyanates, which include, for example, butylene-1,4-diisocyanate, ethylene diisocyanate, trimethylene diisocyanate, tetramethylene diisocyanate, hexamethylene diisocyanate, cyclohexylene-1,2-diisocyanate, cyclohexylene-1,4-diisocyanate, 2,4-tolylene diisocyanate, 2,6-tolylene diisocyanate, 1,4-phenylene diisocyanate, 1,4-naphthalene diisocyanate, 1,5-naphthalene diisocyanate, 4,4'-diphenylmethane diisocyanate, diphenyl-3,3'-dimethyl-4,4'-diisocyanate, xylene diisocyanate, 1-methoxyphenylene-2,4-diisocyanate, benzene-1,2,4-triisocyanate, tolidine diisocyanate and a mixture thereof.

The hydroxyl group-containing cyclopentadiene resin (R1) used in the first invention can be produced by heat copolymerizing 100 parts by weight of the component A with 2–120 parts by weight, preferably 5–100 parts by weight of the component B at a temperature of 150°–300° C., preferably 200°–280° C. in the absence of a catalyst for a time of 10 minutes to 20 hours, preferably 1–10 hours.

In the production of the resin (R1), the weight ratio of component B to component A is very important during the copolymerization reaction. When the amount of component B is less than 2 parts by weight per 100 part by weight of component A, the cut resistance and chipping resistance of the finally obtained rubber composition are insufficient, while when it exceeds 120 parts by weight, the yield of the resin (R1) considerably lowers and also the softening point of the resin (R1) is lowered to degrade the cut resistance, and the blocking of the resin (R1) is caused to degrade the mixing workability.

The hydroxyl group-containing cyclopentadiene resin (R3) used in the second invention can be produced by heat copolymerizing 100 parts by weight of the component A with 1–120 parts by weight, preferably 2–100 parts by weight of the component B and 2–150 parts by weight, preferably 5–100 parts by weight of the component D at a temperature of 150°–300° C., preferably 200°-280° C. in the absence of a catalyst for a time of 10 minutes to 20 hours, preferably 1-10 hours.

In the production of the resin (R3), the weight ratio of component B or D to component A is very important during the copolymerization reaction. When the amount of component B is less than 1 part by weight or the amount of component D is less than 2 parts by weight per 100 parts by weight of component A, the cut resistance and chipping resistance of the finally obtained rubber composition are insufficient, while when the amount of the component B exceeds 120 parts by weight or the amount of component D exceeds 150 parts by weight, the yield of the resin (R3) considerably lowers and also the softening point of the resin (R3) is lowered to degrade the cut resistance, and the blocking of the resin (R3) is caused to degrade the mixing workability.

In the production of the above resins (R1, R3), unsaturated components contained in petroleum fraction, particularly unsaturated aromatic component may be used together with the component A in an amount equal to or less than the amount of the component A used. As the unsaturated compound, use may be made of styrene, α-methylstyrene, vinyl toluene, indene, methylindene and a mixture thereof. Particularly, a so-called C9 fraction by-produced in the decomposition of naphtha or the like is industrially preferable.

By using such an unsaturated component, some properties of the resulting rubber composition can be improved. For instance, the cut resistance can be further improved by the use of styrene or the like. In any case, the weight ratio of component B or D to component A is unchanged within the range defined above.

The reaction between the hydroxyl group-containing cyclopentadiene resin (R1) or (R3) and the component C or E for the production of the resin (R2) or (R4) according to the invention is carried out at a temperature of 20°-300° C., preferably 30°-280° C. for a time of 10 minutes to 20 hours, preferably 30 minutes to 15 hours. Moreover, the component C or E is used in such an amount that the equivalent ratio of isocyanate group and/or carboxyl group and/or acid anhydride group (one acid anhydride group is bivalent) and/or ester group in the component C or E to hydroxyl group in the resin (R1) or (R3) is within a range of 0.05-1.5, preferably 0.1-1.2.

When the equivalent ratio of the component C or E is less than 0.05, the effect of making the molecular weight of the resin (R1) or (R3) higher is hardly observed and hence the cut resistance of the finally obtained rubber composition is insufficient. On the other hand, when the equivalent ratio exceeds 1.5, the change of the resin through the remaining polar group such as remaining isocyanate group, carboxyl group or the like with the lapse of time becomes conspicuous or the curing rate of the rubber composition considerably lowers.

Furthermore, when the component C or E is the polybasic acid ester, the reaction can efficiently be performed by using an ester exchange catalyst such as calcium acetate, zinc acetate, aluminum alkoxide or the like.

The resin (R2) or (R4) used in the invention is preferable to have a softening point of 50°-190° C., particularly 70°-180° C. as measured by ring and ball method (according to JIS K2531-60). When the softening point is lower than 50° C., the modulus at low extension of the rubber composition lowers and the cut resistance is degraded and also the mixing workability tends to degrade by the blocking of the resin. While, when it is higher than 190° C., it is difficult to uniformly disperse the resin into rubber.

According to the invention, the resin (R2) or (R4) is compounded with rubber in an amount of 1-30 parts by weight, preferably 3-15 parts by weight based on 100 parts by weight of rubber. When the amount of the resin is less than 1 part by weight, the addition effect is not developed and the cut resistance and chipping resistance are not improved. On the other hand, when it exceeds 30 parts by weight, the addition effect is saturated and the properties such as wear resistance and the like are considerably degraded.

In addition to the resin (R2) or (R4), the rubber composition according to the invention may properly contain additives usually used in rubber industry such as reinforcing filler, vulcanizing agent, vulcanization accelerator, accelerator activator, softening agent, antioxidant and the like.

The following examples are given in illustration of the invention and are not intended as limitations thereof.

REFERENCE EXAMPLE 1

Into an autoclave of 2 l capacity were charged 574 g of dicyclopentadiene (DCPD) having a purity of 97%, 126 g of allyl alcohol (22.6 parts by weight per 100 parts by weight of DCPD) and 300 g of mixed xylene, which were heated at 260° C. in a nitrogen gas atmosphere for 3 hours with stirring. After the completion of the heating, the autoclave was cooled. Then, unreacted monomers, low polymer and xylene were removed from the mass through distillation to obtain 604 g of a resin (I) as a residue. The resin (I) had a softening point of 93.0° C. and a hydroxyl value of 139 mgKOH/g.

Into a three necked flask of 1.5 l capacity were charged 400 g of the resin (I), 96.2 g of dimethyl terephthalate (0.8 as an equivalent ratio to hydroxyl group in the resin) and 2.7 g of zinc acetate and then the reaction was carried out at 200° C. for 4 hours while blowing a nitrogen gas to remove methanol. After the completion of the reaction, the remaining methanol was removed through distillation to obtain a resin No. 1. The resin No. 1 had a softening point of 136.5° C. and a hydroxyl value of 29 mgKOH/g.

REFERENCE EXAMPLE 2

631 g of DCPD having a purity of 97%, 69 g of allyl alcohol (10.9 parts by weight per 100 parts by weight of DCPD) and 300 g of mixed xylene were reacted in an autoclave of 2 l capacity by heating at 260° C. for 3.5 hours with stirring, and then the same procedure as in Reference Example 1 was repeated to obtain 598 g of a resin (II). The resin (II) had a softening point of 116.0° C. and a hyroxyl value of 85 mgKOH/g.

500 g of the resin (II), 58.6 g of dimethyl terephthalate (0.8 as an equivalent ratio to hydroxyl group of the resin) and 1.7 g of zinc acetate were reacted in a three-necked flask of 1.5 l capacity at 200° C. for 4 hours while blowing a nitrogen gas to remove methanol, and then the same procedure as in Reference Example 1 was repeated to obtain a resin No. 2. The resin No. 2 had a softening point of 153.0° C. and a hydroxyl value of 18 mgKOH/g.

REFERENCE EXAMPLE 3

A $C_5$ cracked fraction(boiling point: 28°-60° C.) by-produced in the production of ethylene, propylene and the like through steam cracking of naphtha was heated at 120° C. for 4 hours, from which C$_5$ fraction was removed by distillation to obtain a residue comprising 85% of DCPD and 15% of cyclopentadiene and isoprene or piperilene codimer. 658 g of this residue containing 85% of DCPD, 42 g of 2 butene-1,4-diol (mixture of cis- and trans-bodies, 7.5 parts by weight per 100 parts by weight of DCPD) and 300 g of mixed xylene were reacted in an autoclave by heating at 260° C. for 2.5 hours with stirring, and then the same procedure as in Reference Example 1 was repeated to obtain 589 g of a resin (III). The resin (III) had a softening point of 94.0° C. and a hydroxyl value of 70.4 mgKOH/g.

500 g of the resin (III), 56.0 g of dimethyl terephthalate (0.92 as an equivalent ratio to hydroxyl group of the resin) and 1.6 g of zinc acetate were reacted in a three-necked flask of 1.5 l capacity at 200° C. for 4 hours while blowing a nitrogen gas to remove methanol, and then the same procedure as in Reference Example 1 was repeated to obtain a resin No. 3. The resin No. 3 had a softening point of 130.0° C. and a hydroxyl value of 15 mgKOH/g.

REFERENCE EXAMPLE 4

477 g of DCPD with a purity of 97%, 223 g of allyl alcohol (46.8 parts by weight per 100 parts by weight of DCPD) and 300 g of mixed xylene were reacted in an autoclave of 2 l capacity by heating at 260° C. for 5 hours with stirring, and then the same procedure as in Reference Example 1 was repeated to obtain 577 g of a resin (IV). The resin (IV) had a softening point of 89.5° C. and a hydroxyl value of 245 mgKOH/g.

500 g of the resin (IV), 169.6 g of dimethyl terephthalate (0.8 as an equivalent ratio to hydroxyl group of the resin) and 4.8 g of zinc acetate were reacted in a three-necked flask of 1.5 l capacity at 200° C. for 4 hours while blowing a nitrogen gas to remove methanol, and then the same procedure as in Reference Example 1 was repeated to obtain a resin No. 4. The resin No. 4 had a softening point of 170.0° C. and a hydroxyl value of 52 mgKOH/g.

REFERENCE EXAMPLE 5

500 g of the above resin (II) obtained in Reference Example 2, 44.9 g of phthalic anhydride (0.8 as an equivalent ratio to hydroxyl group of the resin) and 100 g of mixed xylene were reacted in a three-necked flask of 1.5 l capacity at 210° C. for 11 hours while blowing a nitrogen gas to remove water. After the completion of the reaction, the remaining water and mixed xylene were removed by distillation to obtain a resin No. 5. The resin No. 5 had a softening point of 151.5° C. and a hydroxyl value of 20 mgKOH/g.

REFERENCE EXAMPLE 6

430 g of DCPD with a purity of 97%, 90 g of allyl alcohol (21.6 parts by weight per 100 parts by weight of DCPD), 360 g of aromatic fraction produced through thermal cracking of naphtha and having a boiling point of 140°-280° C. and 120 g of mixed xylene were reacted in an autoclave by heating at 260° C. for 4 hours with stirring, and then the same procedure as in Reference Example 1 was repeated to obtain 596 g of a resin (V). The resin (V) had a softening point of 104.0° C. and a hydroxyl group of 102 mgKOH/g.

500 g of the resin (V), 53.9 g of phthalic anhydride (0.8 as an equivalent ratio to hydroxyl group of the resin) and 100 g of mixed xylene were reacted in a three-necked flask of 1.5 l capacity at 210° C. for 11 hours while blowing a nitrogen gas to remove water, and then the same procedure as in Reference Example 5 was repeated to obtain a resin No. 6. The resin No. 6 had a softening point of 166.0° C. and a hydroxyl value of 23 mgKOH/g.

REFERENCE EXAMPLE 7

403 g of DCPD with a purity of 97%, 226 g of aromatic fraction produced through thermal cracking of naphtha and having a boiling point of 140°-280° C. and 371 g of mixed xylene were reacted in an autoclave by heating at 260° C. for 3 hours with stirring, and then the same procedure as in Reference Example 1 was repeated to obtain 490 g of a comparative resin a having a softening point of 131° C.

REFERENCE EXAMPLE 8

500 g of DCPD with a purity of 97% and 500 g of mixed xylene were reacted in an autoclave by heating at 250° C. for 4 hours with stirring, and then the same procedure as in Reference Example 1 was repeated to obtain 342 g of a comparative resin b having a softening point of 108° C.

REFERENCE EXAMPLE 9

400 g of the resin (I) obtained in Reference Example 1 was dissolved into 300 g of toluene and 69 g of 2,4-tolylene diisocyanate (0.8 as an equivalent ratio to hydroxyl group of the resin) was added dropwise thereto with stirring, which were reacted at 65° C. in a nitrogen gas atmosphere for 11.5 hours. After the confirmation of remaining no isocyanate group by an infrared absorption spectral analysis, toluene was removed by distillation to obtain a comparative resin c. The resin c had a softening point of 146.0° C. and a hydroxyl value of 20 mgKOH/g (which corresponds to resin No. 6 of U.S. patent application Ser. No. 12,468).

REFERENCE EXAMPLE 10

600 g of dicyclopentadiene (DCPD) having a purity of 97%, 67 g of 5-ethylidene norbornene-2 (ENB, 11.2 parts by weight per 100 parts by weight of DCPD), 33 g of allyl alcohol (5.5 parts by weight per 100 parts by weight of DCPD) and 300 g of mixed xylene were reacted in an autoclave of 2 l capacity by heating at 260° C. in a nitrogen gas atmosphere for 5 hours with stirring. After the completion of the heating, the autoclave was cooled. Then, unreacted monomers, low polymer and xylene were removed from the mass by distillation to obtain 637 g of a resin (VI). The resin (VI) had a softening point of 142.0° C. and a hydroxyl value of 48 mgKOH/g.

500 g of the resin (VI) was dissolved into 300 g of toluene and 29.8 g of 2,4-tolylene diisocyanate (0.8 as an equivalent ratio to hydroxyl group of the resin) was added dropwise thereto with stirring, which were reacted in a nitrogen gas atmosphere at 65° C. for 11.5 hours. After the confirmation of remaining no isocyanate group by an infrared absorption spectral analysis, toluene was removed by distillation to obtain a resin No. 7. The resin No. 7 had a softening point of 156.0° C. and a hydroxyl value of 10 mgKOH/g.

REFERENCE EXAMPLE 11

500 g of DCPD with a purity of 97%, 67 g of ENB with a purity of 98% (13.4 parts by weight per 100 parts by weight of DCPD), 33 g of allyl alcohol (6.6 parts by weight per 100 parts by weight of DCPD), 200 g of aromatic fraction produced through thermal cracking of naphtha and having a boiling point of 140°-280° C. and 200 g of mixed xylene were reacted in an autoclave by heating at 260° C. for 7 hours with stirring, and then the same procedure as in Reference Example 10 was repeated to obtain 662 g of a resin (VII). The resin (VII) had a softening point of 137.5° C. and a hydroxyl value of 48 mgKOH/g.

500 g of the resin (VII) was dissolved into 300 g of toluene and 37.3 g of 2,4-tolylene diisocyanate (1.0 as an equivalent ratio to hydroxyl group of the resin) was added dropwise thereto with stirring, and then the same procedure as in Reference Example 10 was repeated to obtain a resin No. 8. The resin No. 8 had a softening point of 147.5° C. and a hyroxyl value of 6 mgKOH/g.

REFERENCE EXAMPLE 12

A $C_5$ fraction (boiling point: 28°-60° C.) by-produced in the production of ethylene, propylene and the like through steam cracking of naphtha was heated at 120° C. for 4 hours, from which a $C_5$ fraction was removed by distillation to obtain a residue comprising 85% of DCPD and 15% of cyclopentadiene and isoprene or piperilene codimer. 613 g of this residue containing 85% of DCPD, 58 g of ENB with a purity of 98% (11.1 parts by weight per 100 parts by weight of DCPD), 29 g of 2-butene-1,4-diol (mixture of cis- and trans-bodies, 5.6 parts by weight per 100 parts by weight of DCPD) and 300 g of mixed xylene were reacted in an autoclave by heating at 260° C. for 4 hours with stirring, and then the same procedure as in Reference Example 10 was repeated to obtain 559 g of a resin (VIII). The resin (VIII) had a softening point of 119.0° C. and a hydroxyl value of 62 mgKOH/g.

500 g of the resin (VIII) was fused by heating at 140° C., to which was dropwise added 43.3 g of 2,4-tolylene diisocyanate (0.9 as an equivalent ratio to hydroxyl group of the resin) with stirring and then reacted in a nitrogen gas atmosphere for 2 hours to obtain a resin No. 9. The resin No. 9 had a softening point of 142.5° C. and a hydroxyl value of 8 mgKOH/g.

REFERENCE EXAMPLE 13

500 g of the resin (VI) obtained in Reference Example 10, 33.2 g of dimethyl terephthalate (0.8 as an equivalent ratio to hydroxyl group of the resin) and 0.9 g of zinc acetate were reacted in a three-necked flask of 1.5 l capacity at 200° C. for 4 hours while blowing a nitrogen gas to remove methanol. After the completion of the reaction, the remaining methanol was removed by distillation to obtain a resin No. 10. The resin No. 10 had a softening point of 151.0° C. and a hydroxyl value of 11 mgKOH/g.

REFERENCE EXAMPLE 14

500 g of the resin (VIII) obtained in Reference Example 12, 42.9 g of dimethyl terephthalate (0.8 as an equivalent ratio to hydroxyl group of the resin) and 1.2 g of zinc acetate were reacted in a three-necked flask of 1.5 l capacity at 200° C. for 4 hours while blowing a nitrogen gas to remove methanol, and then the same procedure as in Reference Example 13 was repeated to obtain a resin No. 11. The resin No. 11 had a softening point of 140.5° C. and a hydroxyl value of 13 mgKOH/g.

REFERENCE EXAMPLE 15

403 g of DCPD with a purity of 97%, 226 g of aromatic fraction produced through thermal cracking of naphtha and having a boiling point of 140°-280° C. and 371 g of mixed xylene were reacted in an autoclave by heating at 260° C. for 3 hours with stirring, and then the same procedure as in Reference Example 10 was repeated to obtain 490 g of a comparative resin d having a softening point of 131° C.

REFERENCE EXAMPLE 16

500 g of DCPD with a purity of 97% and 500 g of mixed xylene were reacted in an autoclave by heating at 250° C. for 4 hours with stirring, and then the same procedure as in Reference Example 10 was repeated to obtain 342 g of a comparative resin e having a softening point of 108° C.

EXAMPLES 1-6, COMPARATIVE EXAMPLES 1-3

To 100 parts by weight of styrene-butadiene copolymer rubber (SBR 1500) was added 12 parts by weight of each of the resins synthesized in Reference Example 1 to 9, which was kneaded with additives shown in the following Table 1 by means of a Banbury mixer. After the vulcanization of the resulting rubber composition, the cut resistance and heat build-up as well a the appearance of tread when using this rubber composition as a tire tread were evaluated by the following methods. The thus obtained results are shown in Table 1.

(1) Cut resistance

A vulcanized sample sheet was damaged by a stainless steel knife dropped from a certain height in a swinging pendulum testing machine to measure a cut depth. The cut resistance was evaluated by an index on the basis that the value of Comparative Example 1 was 100. The larger the index value, the better the cut resistance.

(2) Heat build-up

The rebound resilience was measured according to a method of JIS K6301. The heat build-up was evaluated by an index on the basis that the value of Comparative Example 1 was 100. The larger the index value, the better the heat build-up.

(3) Test for tread appearance

A test tire for truck and bus having a size of 1000 R20 was manufactured by dividing a tread into four segments and applying the rubber compositions of Table 1 to these segments. After the test tire was run on a bad road having many projected rocks in stone pite or the like while frequently applying hard braking over a distance of 5,000 km, the number of large cuts (having a depth of not less than 5 mm) and small cuts (having a depth of not less than 1 mm but less than 5 mm) per 100 $cm^2$ of tread surface and the chipping number (rubber piece having an area of not less than 25 $mm^2$ is sliced off from the tread) were measured every test tire. The tread appearance was represented by an index on the basis that the value of Comparative Example 1 was 100. The larger the index value, the better the tread appearance.

TABLE 1

|  | Example |  |  |  |  |  | Comparative Example |  |  |
|---|---|---|---|---|---|---|---|---|---|
|  | 1 | 2 | 3 | 4 | 5 | 6 | 1 | 2 | 3 |
| SBR 1500 | 100 | 100 | 100 | 100 | 100 | 100 | 100 | 100 | 100 |
| Carbon black ISAF | 50 | 50 | 50 | 50 | 50 | 50 | 50 | 50 | 50 |
| Stearic acid | 2 | 2 | 2 | 2 | 2 | 2 | 2 | 2 | 2 |
| Santoflex 13 *1 | 1 | 1 | 1 | 1 | 1 | 1 | 1 | 1 | 1 |
| Zinc white | 3 | 3 | 3 | 3 | 3 | 3 | 3 | 3 | 3 |
| N,N'-diphenylguanidine | 0.5 | 0.5 | 0.5 | 0.5 | 0.5 | 0.5 | 0.5 | 0.5 | 0.5 |
| dibenzothiazyldisulfide | 1 | 1 | 1 | 1 | 1 | 1 | 1 | 1 | 1 |
| Sulfur | 1.7 | 1.7 | 1.7 | 1.7 | 1.7 | 1.7 | 1.7 | 1.7 | 1.7 |
| Resin No. 1 | 12 | — | — | — | — | — | — | — | — |
| Resin No. 2 | — | 12 | — | — | — | — | — | — | — |
| Resin No. 3 | — | — | 12 | — | — | — | — | — | — |
| Resin No. 4 | — | — | — | 12 | — | — | — | — | — |
| Resin No. 5 | — | — | — | — | 12 | — | — | — | — |
| Resin No. 6 | — | — | — | — | — | 12 | — | — | — |
| Resin a | — | — | — | — | — | — | 12 | — | — |
| Resin b | — | — | — | — | — | — | — | 12 | — |
| Resin c | — | — | — | — | — | — | — | — | 12 |
| Results | | | | | | | | | |
| Cut resistance (index) | 120 | 121 | 111 | 150 | 122 | 135 | 100 | 86 | 119 |
| Heat build-up (index) | 100 | 101 | 102 | 96 | 98 | 97 | 100 | 99 | 91 |
| Tread appearance (index) | | | | | | | | | |
| large cut | 118 | 118 | 112 | 143 | 125 | 131 | 100 | 82 | 120 |
| small cut | 117 | 119 | 113 | 137 | 124 | 128 | 100 | 90 | 118 |
| chipping | 109 | 110 | 122 | 109 | 110 | 108 | 100 | 98 | 119 |

*1: antioxidant, trade name, made by Mitsubishi Monsanto Kasei K.K.

As seen from Table 1, the cut resistance and chipping resistance are considerably improved in the rubber compositions according to the first invention and also the heat build up is improved.

EXAMPLES 7-12, COMPARATIVE EXAMPLES 4-6

A rubber composition was prepared according to a compounding recipe shown in the following Table 2, to which was made the same evaluation as in Example 1. The thus obtained results are shown in Table 2. The evaluation was represented by an index on the basis that the value of Comparative Example 4 was 100, wherein the larger the index value, the better the property.

TABLE 2

|  | Example |  |  |  |  |  | Comparative Example |  |  |
|---|---|---|---|---|---|---|---|---|---|
|  | 7 | 8 | 9 | 10 | 11 | 12 | 4 | 5 | 6 |
| Natural rubber | 100 | 100 | 100 | 100 | 100 | 100 | 100 | 100 | 100 |
| Carbon black ISAF | 50 | 50 | 50 | 50 | 50 | 50 | 50 | 50 | 50 |
| Stearic acid | 3 | 3 | 3 | 3 | 3 | 3 | 3 | 3 | 3 |
| Santoflex 13 | 1 | 1 | 1 | 1 | 1 | 1 | 1 | 1 | 1 |
| Zinc white | 4.5 | 4.5 | 4.5 | 4.5 | 4.5 | 4.5 | 4.5 | 4.5 | 4.5 |
| N-oxydiethylene-2-benzothaizole sulfeneamide | 0.6 | 0.6 | 0.6 | 0.6 | 0.6 | 0.6 | 0.6 | 0.6 | 0.6 |
| Sulfur | 2 | 2 | 2 | 2 | 2 | 2 | 2 | 2 | 2 |
| Resin No. 1 | 10 | — | — | — | — | — | — | — | — |
| Resin No. 2 | — | 10 | — | — | — | — | — | — | — |
| Resin No. 3 | — | — | 10 | — | — | — | — | — | — |
| Resin No. 4 | — | — | — | 10 | — | — | — | — | — |
| Resin No. 5 | — | — | — | — | 10 | — | — | — | — |
| Resin No. 6 | — | — | — | — | — | 10 | — | — | — |
| Resin a | — | — | — | — | — | — | 10 | — | — |
| Resin b | — | — | — | — | — | — | — | 10 | — |
| Resin c | — | — | — | — | — | — | — | — | 10 |
| Results | | | | | | | | | |
| Cut resistance (index) | 121 | 122 | 110 | 143 | 120 | 137 | 100 | 85 | 119 |
| Heat build-up (index) | 101 | 101 | 102 | 98 | 99 | 98 | 100 | 100 | 90 |
| Tread appearance (index) | | | | | | | | | |
| large cut | 117 | 118 | 113 | 142 | 124 | 125 | 100 | 81 | 121 |
| small cut | 116 | 117 | 110 | 136 | 121 | 132 | 100 | 92 | 117 |
| chipping | 111 | 110 | 121 | 110 | 113 | 109 | 100 | 95 | 116 |

As seen from Table 2, the rubber compositions according to the first invention exhibit considerably improved cut resistance and chipping resistance as well as the improvement of the heat build-up even when using natural rubber.

EXAMPLES 13-17, COMPARATIVE EXAMPLES 7-8

To 100 parts by weight of styrene-butadiene copolymer rubber (SBR 1500) was added 12 parts by weight of each of the resins synthesized in Reference Examples 10 to 16, which was kneaded with additives shown in the following Table 3 by means of a Banbury mixer. After the vulcanization of the resulting rubber composition, the cut resistance and the appearance of tread when using this rubber composition as a tire tread were evaluated by the same methods as described in Example 1. The thus obtained results are shown in Table 3.

TABLE 3

| | Example | | | | | Comparative Example | |
|---|---|---|---|---|---|---|---|
| | 13 | 14 | 15 | 16 | 17 | 7 | 8 |
| SBR 1500 | 100 | 100 | 100 | 100 | 100 | 100 | 100 |
| Carbon black ISAF | 50 | 50 | 50 | 50 | 50 | 50 | 50 |
| Stearic acid | 2 | 2 | 2 | 2 | 2 | 2 | 2 |
| Santoflex 13 | 1 | 1 | 1 | 1 | 1 | 1 | 1 |
| Zinc white | 3 | 3 | 3 | 3 | 3 | 3 | 3 |
| N,N'-diphenyl-guanidine | 0.5 | 0.5 | 0.5 | 0.5 | 0.5 | 0.5 | 0.5 |
| dibenzothiazyl-disulfide | 1 | 1 | 1 | 1 | 1 | 1 | 1 |
| Sulfur | 1.7 | 1.7 | 1.7 | 1.7 | 1.7 | 1.7 | 1.7 |
| Resin No. 7 | 12 | — | — | — | — | — | — |
| Resin No. 8 | — | 12 | — | — | — | — | — |
| Resin No. 9 | — | — | 12 | — | — | — | — |
| Resin No. 10 | — | — | — | 12 | — | — | — |
| Resin No. 11 | — | — | — | — | 12 | — | — |
| Resin d | — | — | — | — | — | 12 | — |
| Resin e | — | — | — | — | — | — | 12 |
| Results | | | | | | | |
| Cut resistance (index) | 130 | 131 | 133 | 129 | 130 | 100 | 86 |
| Tread appearance (index) | | | | | | | |
| large cut | 128 | 127 | 131 | 126 | 127 | 100 | 82 |
| small cut | 135 | 133 | 129 | 134 | 129 | 100 | 90 |
| chipping | 115 | 125 | 126 | 124 | 126 | 100 | 98 |

As seen from Table 3, the cut resistance and chipping resistance are considerably improved in the rubber composition according to the second invention.

EXAMPLES 18-22, COMPARATIVE EXAMPLES 9-10

A rubber composition was prepared according to a compounding recipe as shown in the following Table 4, and the same evaluations as in Example 13 were made to obtain results as shown in Table 4, wherein the evaluation was represented by an index on the basis that the value of Comparative Example 9 was 100. The larger the index value, the better the property.

TABLE 4

| | Example | | | | | Comparative Example | |
|---|---|---|---|---|---|---|---|
| | 18 | 19 | 20 | 21 | 22 | 9 | 10 |
| Natural rubber | 100 | 100 | 100 | 100 | 100 | 100 | 100 |
| Carbon black ISAF | 50 | 50 | 50 | 50 | 50 | 50 | 50 |
| Stearic acid | 3 | 3 | 3 | 3 | 3 | 3 | 3 |
| Santoflex 13 | 1 | 1 | 1 | 1 | 1 | 1 | 1 |
| Zinc white | 4.5 | 4.5 | 4.5 | 4.5 | 4.5 | 4.5 | 4.5 |
| N-oxydiethylene-2-benzothiazole sulfeneamide | 0.6 | 0.6 | 0.6 | 0.6 | 0.6 | 0.6 | 0.6 |
| Sulfur | 2 | 2 | 2 | 2 | 2 | 2 | 2 |
| Resin No. 7 | 10 | — | — | — | — | — | — |
| Resin No. 8 | — | 10 | — | — | — | — | — |
| Resin No. 9 | — | — | 10 | — | — | — | — |
| Resin No. 10 | — | — | — | 10 | — | — | — |
| Resin No. 11 | — | — | — | — | 10 | — | — |
| Resin d | — | — | — | — | — | 10 | — |
| Resin e | — | — | — | — | — | — | 10 |
| Results | | | | | | | |
| Cut resistance (index) | 128 | 129 | 134 | 131 | 129 | 100 | 85 |
| Tread appearance (index) | | | | | | | |
| large cut | 125 | 130 | 131 | 130 | 128 | 100 | 81 |
| small cut | 129 | 135 | 133 | 134 | 130 | 100 | 92 |
| chipping | 116 | 125 | 126 | 121 | 124 | 100 | 95 |

As seen from Table 4, the rubber compositions according to the second invention exhibit considerably improved cut resistance and chipping resistance even when using natural rubber.

As mentioned above, the rubber compositions according to the invention are considerably excellent in the cut resistance and chipping resistance as well as the heat build up, so that they are useful for a tread in tires, particularly large size tires frequently running on bad roads. Of course, they can be used as a sidewall or other parts of the tire, or for the other rubber articles such as conveyor belt, hose and the like.

What is claimed is:

1. A rubber composition comprising:
   (A) 1 to 30 parts by weight of a resin (R2), based on
   (B) 100 parts by weight of at least one rubber selected from the group consisting of natural and synthetic rubbers,
   wherein said resin (R2) is obtained by reacting:
   (1) a hydroxyl group-containing cyclopentadiene resin (R1), which is obtained by heat copolymerizing:
      (i) 100 parts by weight of a component A being at least one compound selected from the group consisting of a cyclopentadiene ring containing compound represented by the following general formula:

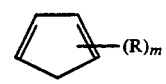

(I)

wherein R is an alkyl group having a carbon number of 1-3 and m is an integer of 0-6, and its Diels-Alder reaction adduct,
      (ii) with 2 to 120 parts by weight of a component B being a compound having a polymerizable double bond and hydroxyl group in its molecule, and
      (iii) a component C being at least one compound selected from the group consisting polybasic acids, anhydrides and esters thereof,
   in such a manner that an equivalent ratio of a carboxyl group, acid anhydride (having one bivalent acid anhydride), ester group or mixtures thereof in said component C to hydroxyl group in said resin (R1) is within a range of 0.05-1.5.

2. The rubber composition according to claim 1, wherein said component A having a carbon number of 3-22 is selected from the group consisting of alcohols having a single alcoholic group having two alcoholic groups, unsaturated cyclopentadiene-methylcyclopentadiene codimer and tricyclopentadiene.

3. The rubber composition according to claim 1, wherein said component B is selected from the group consisting of unsaturated alcohols having a carbon number of 3-22, unsaturated divalent alcohols, hydroxyalkyl acrylates and hydroxyalkyl methacrylates.

4. The rubber composition according to claim 1, wherein said component C is selected from the group consisting of aliphatic polybasic acids, alicyclic polybasic acids, aromatic polybasic acids, anhydrides and esters thereof.

* * * * *